(12) United States Patent
Rao

(10) Patent No.: US 8,700,014 B2
(45) Date of Patent: Apr. 15, 2014

(54) AUDIO GUIDED SYSTEM FOR PROVIDING GUIDANCE TO USER OF MOBILE DEVICE ON MULTI-STEP ACTIVITIES

(76) Inventor: Bindu Rama Rao, Laguna Niguel, CA (US)

( * ) Notice: Subject to any disclaimer, the term of this patent is extended or adjusted under 35 U.S.C. 154(b) by 941 days.

(21) Appl. No.: 11/881,195

(22) Filed: Jul. 25, 2007

(65) Prior Publication Data

US 2008/0119169 A1 May 22, 2008

Related U.S. Application Data

(60) Provisional application No. 60/860,700, filed on Nov. 22, 2006.

(51) Int. Cl.
*H04L 29/06* (2006.01)

(52) U.S. Cl.
USPC ............ 455/414.3; 455/414.1; 455/418; 455/414.4; 455/466

(58) Field of Classification Search
USPC .......... 455/418, 414.2–414.3, 466, 566, 90.1, 455/414.4

See application file for complete search history.

(56) References Cited

U.S. PATENT DOCUMENTS

| | | | |
|---|---|---|---|
| 7,197,120 B2 * | 3/2007 | Luehrig et al. ............. | 379/88.14 |
| 7,853,272 B2 * | 12/2010 | Tipnis et al. ............... | 455/456.3 |
| 2002/0165666 A1 * | 11/2002 | Fuchs et al. ................... | 701/209 |
| 2005/0108750 A1 * | 5/2005 | Nishikawa et al. ............. | 725/38 |
| 2007/0162459 A1 * | 7/2007 | Desai et al. ..................... | 707/10 |

* cited by examiner

*Primary Examiner* — Marcos Torres

(57) ABSTRACT

An audio guided system (AUGUST) for mobile devices that facilitates the creation and dissemination of audio guided activities (AGAs) from a source computer/device to a plurality of other recipient mobile devices, wherein the AGA is disseminated to the recipient mobile devices in a form that is compatible with the capabilities of the respective recipient mobile devices. The audio guided system comprises the source computer/device, the plurality of other recipient mobile devices and a server.

17 Claims, 12 Drawing Sheets

AUDIO GUIDED SYSTEM FOR PROVIDING GUIDANCE TO USER OF MOBILE DEVICE ON MULTI-STEP ACTIVITIES

CROSS REFERENCES TO RELATED APPLICATIONS

The present application makes reference to, claims priority to, and claims benefit of U.S. Provisional Application Ser. No. 60/860,700 entitled AUDIO GUIDED SYSTEM FOR PROVIDING GUIDANCE TO USER OF MOBILE DEVICE ON MULTI-STEP ACTIVITIES filed on Nov. 22, 2006, the complete subject matter of which is hereby incorporated herein by reference, in its entirety.

This patent application makes reference to U.S. provisional patent Ser. No. 60/849,715, entitled "QUESTIONNAIRE CLIENT FOR MOBILE DEVICE", filed on Oct. 4, 2006. The complete subject matter of the above-referenced United States Patent Application is hereby incorporated herein by reference, in its entirety.

The present application makes reference to U.S. Provisional Application Ser. No. 60/850,084 entitled MOBILE DEVICE FOR CREATING ADHOC QUESTIONNAIRE filed on Oct. 7, 2006, the complete subject matter of which is hereby incorporated herein by reference, in its entirety.

In addition, the present application makes reference to U.S. application Ser. No. 10/985,702 entitled QUESTIONNAIRE NETWORK FOR MOBILE HANDSETS filed on Nov. 10, 2004, the complete subject matter of which is hereby incorporated herein by reference, in its entirety.

BACKGROUND

1. Technical Field

The present invention relates generally to the interactions between mobile handset and a server within a network, and more specifically to the ability to browse through a multi-step process or activity using a mobile handset such as a cell phone.

2. Related Art

Electronic devices, such as mobile phones and personal digital assistants (PDA's), often contain small screens with very limited viewing area. They are constrained in terms of how much information can be displayed, and in terms of user interaction capabilities. The keyboards on cell phones, for example, are not conducive for user data entry, and only brief user inputs can be solicited from a user without annoying the user.

Often a user would want to seek online help using a mobile phone for conducting an activity such as fixing a problem with a car (changing tires for example) or baking a cake, without having to use a bulky notebook computer that might get damaged due to various constraints and problems of a work area. The use of a computer/notebook is not always possible to retrieve helpful information when they are needed, such as during an accident on the highway, or while cooking in a kitchen that has limited space. The use of a mobile phone is preferable in such circumstances but mobile phones in general are not endowed with the features or applications necessary to facilitate easy access to such information in a format that is useable and convenient. The whole process of retrieving necessary information using a mobile phone is inconvenient due to the inability of the Internet websites to provide information that a typical user can easily read, browse through or view on his mobile phone. Information access from Internet based websites from mobile devices are quite often unsatisfactory and not useful due to several factors, not least of which is the multi-media and graphics rich format in which most Internet websites are designed and made available. A mobile phone with a small screen is not a good candidate for viewing such complicated and graphics rich (with graphics, flash screens, video components, etc.) content.

Often, when a user is driving, he would like to access information from a remote source, such as a website maintained by the operator of the network. However, while driving it is very dangerous to read the information displayed on a cell phone. It is also almost impossible to read those small screens on a cell phone and manipulate the buttons on the cell phone while also driving. It is hard enough manipulating a cell phone keyboard when one is not driving, due to the nature of the keyboard and the tiny keys it provides and the small displays it comes with.

Online help, which typically tends to be verbose, is almost unreadable and altogether complex and inappropriate for access from a cell phone. For example, online help for configuring a network card on a PC, or baking a turkey for Thanksgiving, tend to involve a multi-step activity and therefore detailed in its descriptions. Not only are online help websites not suitable for access via cell phones—they make for bad user experience, but also too verbose and repetitive. Thus, users of cell phones refrain from seeking online help from cell phones.

User interaction in real time, such as those provided for a user using a PC on the Internet, are often not possible for a user using a cell phone. For example, the amount of textual information cannot be a full page of textual information that is typically made available on a PC. Graphical information also cannot be large. A typical website provides a rich multi-media experience. The same website, when accessed from a cell phone, would not only be unreadable, due to its large amount of text, graphics and even video, but also frustrating due to the nature of web sites—the design of websites often being multi-media based (predominantly providing large multi-media web pages full of text, graphics, flash-based and even containing videos). Thus, there is a problem in presenting a mobile user with information in order to solicit user input when the user is using a cell phone. Soliciting user input from a user when the user is using a cell phone, rather than a PC, is a big problem.

Cell phones are therefore a device for which traditional websites are ill prepared to provide information. In addition, surveys or questionnaires that are created for Internet based access via a PC are not appropriate for cell phone access. Asking one or more detailed questions with information on how to answer them is possible on a web page that is accessed from a PC. However, the same web page would be unmanageable and difficult to browse and navigate on a cell phone with a small LCD screen and small keyboard for user input.

Further limitations and disadvantages of conventional and traditional approaches will become apparent to one of ordinary skill in the art through comparison of such systems with the present invention as set forth in the remainder of the present application with reference to the drawings.

BRIEF SUMMARY OF THE INVENTION

The present invention is directed to apparatus and methods of operation that are further described in the following Brief Description of the Drawings, the Detailed Description of the Invention, and the claims. Other features and advantages of the present invention will become apparent from the following detailed description of the invention made with reference to the accompanying drawings.

BRIEF DESCRIPTION OF THE DRAWINGS

The numerous objects and advantages of the present invention may be better understood by those skilled in the art by reference to the accompanying figures in which.

DETAILED DESCRIPTION OF THE DRAWINGS

Figure 1:
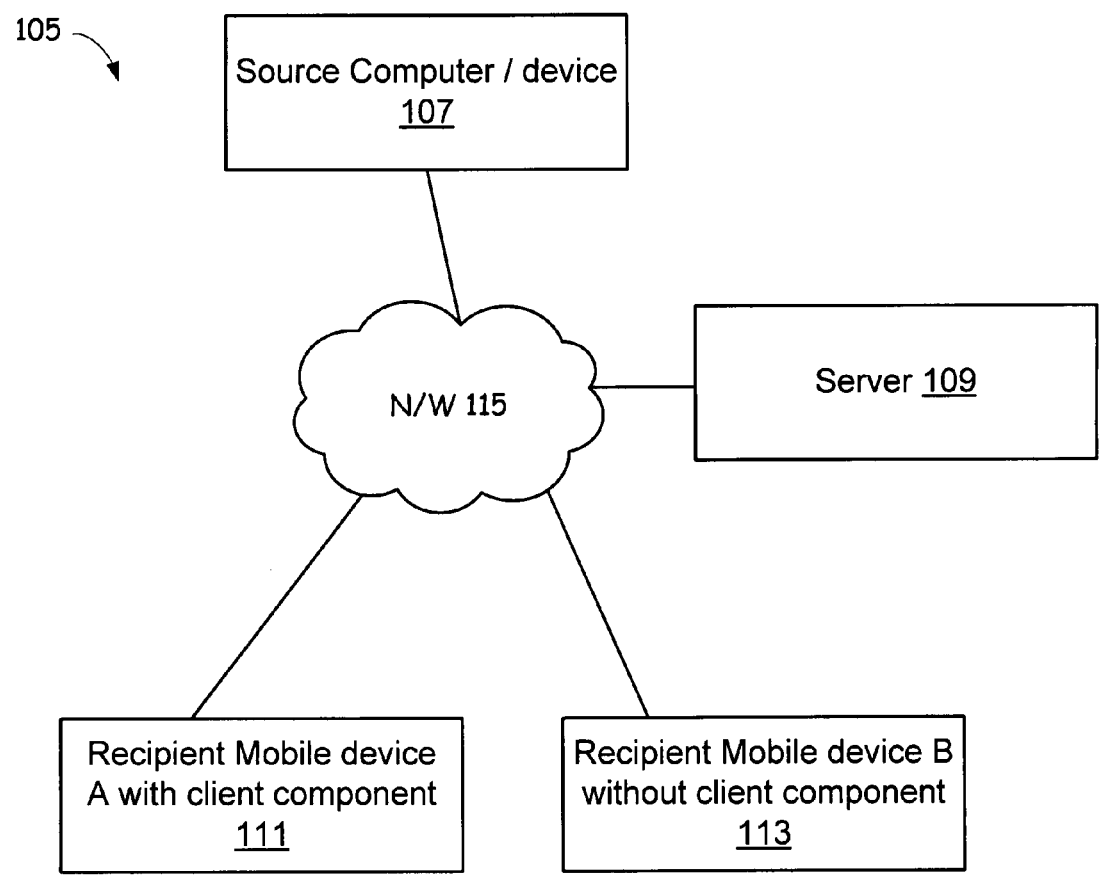
FIG. 1 is a perspective block diagram of an audio guided system for mobile devices that facilitates the creation and dissemination of audio guided activities (AGAs) from a source computer/device to a plurality of other recipient mobile devices, wherein the AGA is disseminated to the recipient mobile devices in a form that is compatible with the capabilities of the respective recipient mobile devices.

FIG. 1 is a perspective block diagram of an audio guided system 105 (AUGUST) for mobile devices that facilitates the creation and dissemination of audio guided activities (AGAs) from a source computer/device 107 to a plurality of other recipient mobile devices 111, 113, wherein the AGA is disseminated to the recipient mobile devices in a form that is compatible with the capabilities of the respective recipient mobile devices 111, 113. The audio guided system 105 comprises the source computer/device 107, the plurality of other recipient mobile devices 111, 113 and a server 109. The display of AGAs in a recipient mobile device, such as the recipient mobile device A 111, requires the use of a corresponding client component, such as a QClient, that can display one step of a multi-step activity at a time. Each AGA comprises textual descriptions, audio preambles, optional audio supplementary information, an optional textual supplementary information, for each step of a multi-step audio guided activity. An AGA is used to describe the method to cook a dish using an associated recipe, the process of executing an operation, such as changing the tire on a car, using an associated multi-step operation, etc. The display of each step involves the display of textual descriptions, the playing of audio information such as a preamble, the optional display of supplementary information and the playing of audio supplementary information, if available. A user can view (often using text, and even graphics if available) and optionally listen to the detailed descriptions of each step of an AGA, one step at a time, and browse through each step.

Some of the plurality of other recipient mobile devices 111, 113 are legacy devices that do not have a necessary client component capable of handling the download and display of AGAs. Others of the plurality of other recipient mobile devices 111, 113 have the client component capable of handling the download and display of the AGAs.

In one embodiment, the server 109 determines which recipient mobile device can handle AGAs (because they comprise the client component capable of handling the AGAs), and which need to be sent a simpler subset of the AGAs that can be displayed/rendered without the client component, such as by the use of a browser in the recipient mobile device that may be used to browse through a hosted version of the AGAs that can present web pages of the AGAs.

The audio guided activity is created/stored/distributed as a packaged content with a multiple step activity, such as an XML file, wherein each step comprises:
- an audio preamble, used to describe in audio form the purpose of the current step and provide an overview of the step (other types of information may also be provided if necessary, in a brief format)
- a textual step description regarding the activity, in succinct form, with minimal text, and
- an audio supplementary information, providing additional details that may help a user better understand the step, its benefits, alternate steps, if any, and any additional detail that may aid the user's comprehension of the step.

Typically, the audio preamble and audio supplementary information are presented to a user in order to provide audio based description and additional details of specific steps of a multi-step activity. The textual step description of each step of a multi-step activity is designed to provide minimal necessary information for a user, with supplementary information in audio or textual (or video and graphics forms too, in some embodiments) form provided to aid user comprehension of the associated step in the multi-step activity.

The textual step description typically comprises a textual description (of the specific step in the multi-step activity) in the form of a small paragraph. Optionally, it also comprises of a graphics or a picture (to be supported in specific embodiments, or in specific devices based on device capability information). In general, the mobile device employs a client that provides a window pane or dialog box (or other similar graphical widgets) for textual description display, with a menu-item "Info" for playing the preamble, and another menu-item "SupplInfo" for playing audio supplementary information while also displaying any supplementary textual information that may be available. In addition, a Next menu-item is provided to advance to a next step of the multi-step activity, if any) and a cancel menu-item that is provided to terminate the multi-step activity.

The source computer device 107 captures audio preambles and supplementary information provided by a user in audio form, captures text descriptions typed in or provided by user in some form, creates a package of such content associated with an audio guided activity, and sends it to a server 109 to be saved and/or disseminated to designated recipients. The recipients use their respective recipient mobile devices 111, 113 for browsing through the audio guided activity when they receive it. They can use the client component, if it is available, for such browsing. Alternatively, they can use a browser (such as a WAP browser) to browse through the AGA.

The server 109 receives AGAs from the source mobile computer/device 107, adds boilerplate text and audio if necessary, determines which of the recipient mobile devices specified, such as recipient mobile devices 111 and 113, can handle the all the contents of the AGA (audio components, textual components, graphics if any, video is any), and which need to be sent a simpler subset of the AGA, such as only text, or only audio components of the AGA.

The server 109 is capable of converting recipient list to a list of phone numbers or IP addresses as needed, in order to communicate the AGA, or a notification regarding the AGA, to the recipient mobile devices 111, 113. In order to play all the components of an AGA, if required, the recipient devices, such as the recipient device 111, have a client component that can handle all the components of a AGA, audio, textual, graphics and even video components).

In one embodiment the client component is required in a recipient mobile device to handle the components of an AGA, such as audio and textual. In order to play all the components of an AGA, if required, the recipient devices, such as the recipient device 113, do not have a client component. Instead, the server 109 makes it possible for them to receive and display/play the AGA by sending them the same AGA in an alternate form, such as a simplified set of web pages, that the recipient client device 113 can display using a browser or some other existing client in the recipient mobile device 113. In addition, the recipient client device 113 will be sent a notification regarding the AGA that also comprises a link that can be activated to download the client component so that it could be installed before displaying the AGA.

The recipient mobile device 113 without client component gets an opportunity to download & install the necessary client component. The user can then activate the download link whereupon the client component is downloaded and installed automatically (or with user opt-in). The user of the recipient mobile device 113 also is given the option, selectively, to receive a subset of AGA that recipient mobile device 113 can handle without the client component.

The recipient mobile device 111 with the client component receives an AGA, lets user browse through each step and view the textual components and listen to audio components for each step them. It is able to play/render/display all portions of an AGA that may be provided, such as audio, text, graphics, video, etc.

The server 109 is capable of completing the incomplete AGA received from the source computer/device 107 or another server (not shown). For example, the source computer/device 107 may send an incomplete AGA with two steps, each with only the audio preamble created (by a user recording the steps of an activity in audio form that incorporates a brief descriptions of steps involved) and the server 109 incorporates a generic textual preamble and a generic textual description in order to complete the AGA. In one embodiment, the server transcribes the audio components into textual components and sends those transcribed text (perhaps along with the other boilerplate text) to recipients who cannot handle audio components of an AGA. Thus, for example, spoken preambles and supplementary information, in a questionnaire can be converted into equivalent textual components by the server 109, in an automated way, so that devices that cannot handle audio preambles and audio supplementary information (or video preambles and video supplementary information) can be provided with equivalent and/or relevant textual components.

The server 109 receives an AGA from a user, incorporates text or graphics as needed, and generic prompt to user, and sends questionnaire to recipients. The recipients are either specified by the user along with the questionnaire or pre-configured and stored in the server 109 to be used to forward AGA. The server 109 provides coupons to a user at the end of the AGA, or during the display of an AGA by means of a menu-item provided to retrieve a coupon and information associated with a coupon. Additionally, it is possible to configure the server 109 to provide coupons (one or more) to a recipient mobile device 111, 113 along with an AGA, such that those coupons can be saved on the recipient mobile device 111, 113 for subsequent usage using the recipient mobile devices 111, 113.

The server 109 also supports the notification of the availability of the AGA and the dissemination of an AGA to the recipient mobile devices 111. The user interaction is facilitated by a client component in the recipient mobile device 111, which is either made available by the manufacturer of the mobile handsets or subsequently downloaded over the air, or otherwise installed by the user. The client component is able to process the received AGA (or portions thereof), playing audio portions such as audio preambles, audio supplementary information, etc. and displaying textual preambles and textual descriptions of individual steps of a multi-step activity/operation.

In one embodiment, the system 105 comprises mobile devices 107, 111, 113 which are a combination of cellular phones, PDAs, etc. and the network is 115 is a wireless and/or wired network, cellular network such as 3G, UMTS, CMDA, GSM, etc., a WLAN network, or a WiMAX network, Internet, Bluetooth, IrDA, etc.

The server 109 receives Audio Guided Activity from source computer/device 107, adds boilerplate text if needed, and forwards it to specified recipients 111, 113. In one embodiment, it multicasts/broadcasts it over a multicast network 115 or a broadcast network 115.

In one embodiment, more than one version of an audio guided activity is created by the source computer device 107, and stored for dissemination at the server 109. Particular versions of the audio guided activity are communicated to specific mobile device 107, 111, 113, based on one or more criteria, such as user preferences, user interests, user group affiliations, membership information, etc. Such preferences user interests, user group affiliations, membership information are stored in the server 109 in one embodiment, and in the mobile devices 107, 111, 113 in another. In a related embodiments, they are stored in both.

In one embodiment, the source computer/device is used to create a multistep audio guided activity that provides at least one (if not more than one) of an audio preambles, short textual descriptions, and audio supplementary information for each of the steps of the multistep audio guided activity. The multistep audio guided activity is sent to server 109 to be disseminated to one or more recipient devices that are mobile phones, PDAs, computers, PCs, etc.

The AGAs facilitated by the present invention are used to create and disseminates multistep activity information such as the steps necessary to diagnose and fix a problem with a machine, an electronic device or a vehicle. AGAs, in accordance with the present invention, are used to provide detailed help/guidance, in a timely fashion to people trying to configure a device, configure a service, or work on a vehicle, etc. For example, an audio guided activity can comprise a sequence of steps necessary to configure a service, a machine, an electronic device or a vehicle.

Figure 2:
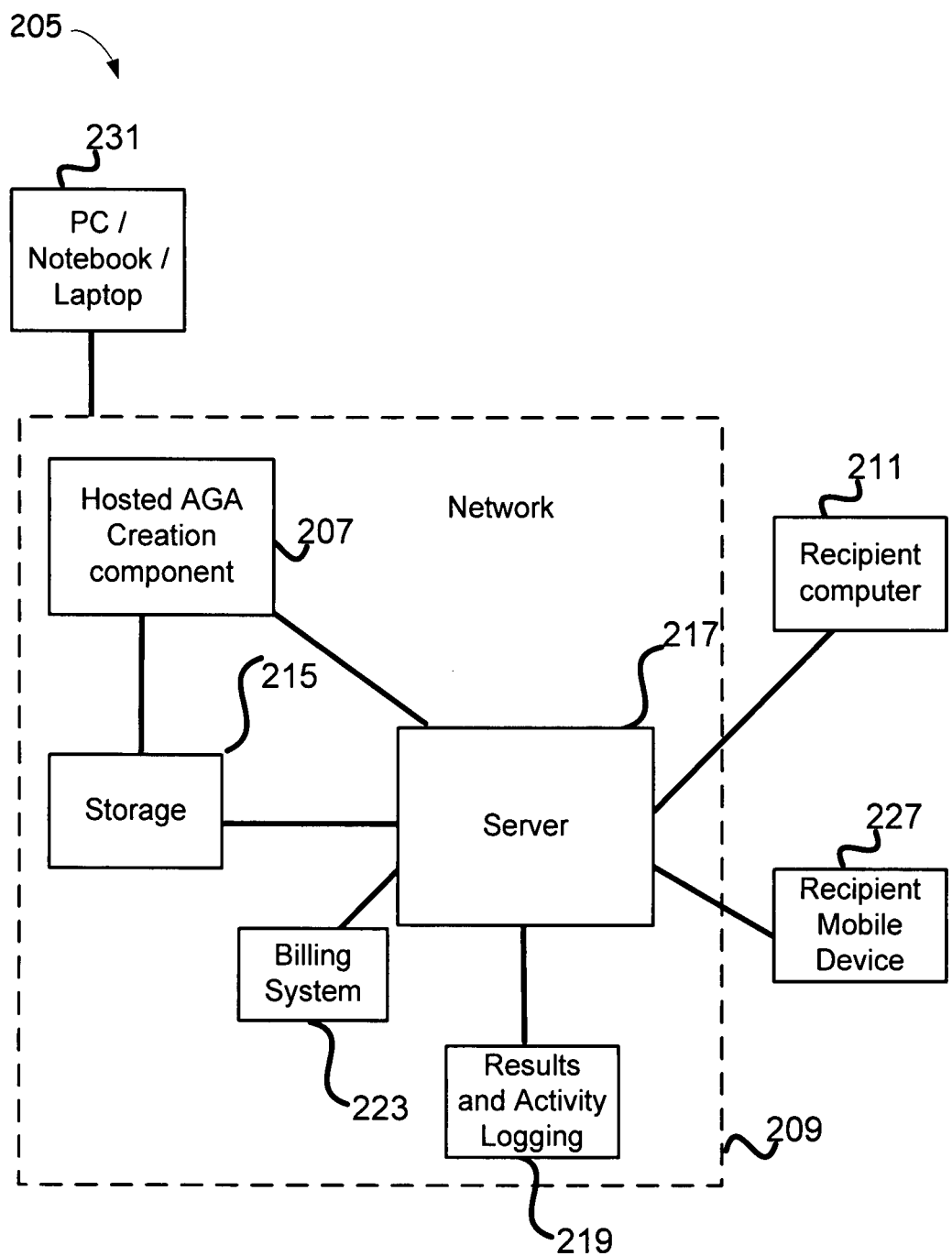
FIG. 2 is a perspective block diagram of a system that supports AGA creation and dissemination, the AGA creation facilitated by the use of a PC/computer, by a user.

FIG. 2 is a perspective block diagram of a system 205 that supports AGA creation and dissemination, the AGA creation facilitated by the use of a PC/computer 231, by a user. The system 205 comprises the PC/computer 231 that a user uses to create AGAs, a server 217 that receives the AGAs and sends them to one or more recipient mobile devices 211, 227, and a hosted AGA creation component 207 that facilitates AGA creation using the PC/laptop/computer 231, or via web pages provided by the server 217. The system 205 also comprises a storage 215 that is used to store AGAs and questionnaires if necessary, and a results and activity logging component 219 that can be used to track AGA creation, AGA dissemination, and other related activities. In addition, the system 205 comprises a billing system 223 that can facilitate billing for the creation of AGAs, the distribution of AGAs, etc.

AGA creation in facilitated by the hosted AGA creation component 207 that can be accessed and used by a user employing the PC/Notebook/Laptop 231. AN AGA creation tool installed in the PC/Notebook/Laptop 231 may also be used by a user to create AGAs that can be uploaded to the server 217. A user with AGA creation tool in the PC/Notebook/Laptop 231 creates an AGA and sends the created AGA to recipients/a mailing-list.

The user can also employ a PC/Notebook/Laptop 231 communicatively coupled to a hosted AGA creation component 217 to create AGAs with only audio inputs and textual inputs provided by the user for the various steps of an associated activity. The AGA is likely to comprise of audio and/or textual preambles for the steps of an audio guided activity, textual descriptions of the steps of the associated activity, supplementary information in audio and textual formats (even graphics and video formats) for each of the steps, etc. Then user provides a recipient list in one or more formats. The server 217 sends out the AGA to recipients specified by the user, using their corresponding mobile phone numbers, IP addresses, email addresses, etc. A recipient user can use his recipient computer 211 to receive or browse thorough the AGA. A different recipient user can use the recipient mobile device 227 to do the same.

When a recipient using the recipient mobile device 227 gets the AGA on his mobile device, the steps of the AGA themselves are provided to the recipient by the server 217, starting with the first step of a multi-step activity. Thus, in the beginning of the AGA, the recipient would view the first step perhaps with an audio preamble and appropriate textual description, and would be able activate an Info menu item to hear the audio preamble for the first step. The user advances to the next step by activating the Next menu item to proceed.

In one embodiment, the recipient device is a legacy device 227 and not capable of letting a recipient user work through the steps of the AGA. For such a device, the server 217 sends a voice mail notification to the recipient device 227 and when triggered by the recipient device 227, causes the audio preamble of the steps to be played as voice information, such as those that employ interactive voice response (IVR) systems (not shown). The user is provided with the option to advance to the next step when ready. Thus, part of the AGA, the audio preamble and audio supplementary information, is played as part of a UVR based audio playback. Such a solution wherein IVR is used makes it possible to incorporate "legacy" devices and land line devices into the system 205 and have them participate in receiving AGAs and browsing through them. The server 217 thus employs the services of an IVR component to provide AGAs to recipients on legacy devices (and other devices that do not have an appropriate client software installed) in order to facilitate access from such devices.

In one embodiment, the recipient mobile device 227 is a legacy device 227 and not capable of letting a recipient user work through the AGA as it does not have a client component. Instead, it has a browser that can be used to browse though the steps of the AGA, the steps provided employing web pages hosted by the server 217, presenting one or more steps in each web page of the AGA.

In one embodiment, an XML audio guided activity (AGA) is created/stored/by a user using a PC/notebook/laptop 231. It is created as an XML file comprising a multiple step activity—wherein each step comprises:
an audio preamble,
a textual step description, and
an audio supplementary information.

The audio preamble and audio supplementary information are played/rendered during a display of a step of activity, when invoked by the user using appropriate menu-items or buttons. The textual step description comprises Textual description in the form of a small paragraph. Optionally, it also comprises of a graphics or a picture (that is also provided as part of the XML AGA).

In one embodiment, the PC/notebook/laptop 231 comprises a tool called the QCreator that can operate in two modes, a questionnaire creation mode and a AGA creation mode. The output created is a Questionnaire or an Audio guided Activity (AGA) to be used by an Audio Guided System (AUGUST). If Questionnaire is the mode set during the use of the tool, a questionnaire is created, with user interface customized for such creation. If AGA is the mode set on the tool, then screens appropriate for the creation of an AGA are provided to the user.

Figure 3A:
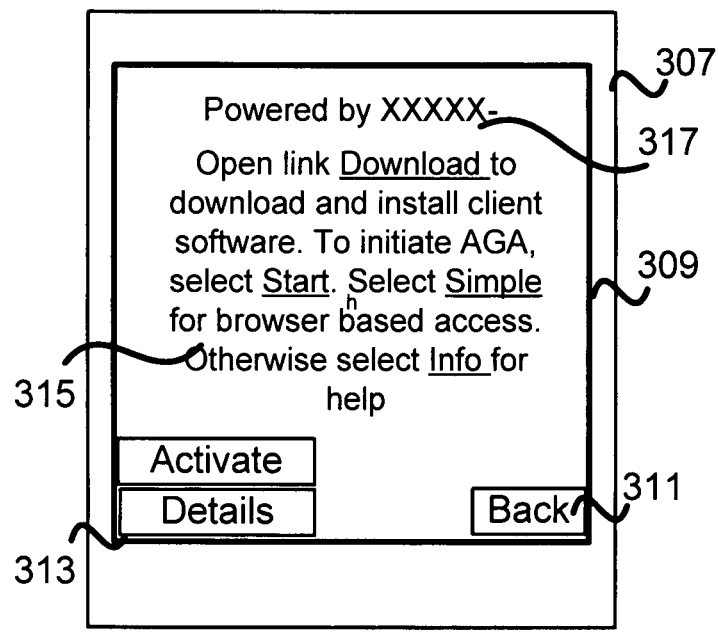
FIG. 3A is an exemplary notification message display screen for a mobile device 307 that supports the display of AGA using a client component, or the browsing through an AGA from the mobile device.

FIG. 3A is an exemplary notification message display screen 309 for a mobile device 307 that supports the display of AGA using a client component, or the browsing through an AGA from the mobile device 307. Notifications, such as those received as an SMS message, received by user (for example, of type Service message) on mobile device 307, offers the user an opportunity to download a client component that is capable of displaying an AGA. If the user of the recipient mobile device does not have an appropriate client component (such as a qClient component capable of displaying an AGA and questionnaires), then the user can still view the AGA by viewing the hosted version of the AGA using a browser in the device, such a browser retrieving one or more web pages for the AGA using a link (URL or some such reference) to the AGA provided as part of the notification message (such as a URL in an SMS message). Thus, the notification also offers link to the AGA that a browser can use to provide access to associated web pages for the AGA. Notification messages (such as SMS based ones) can be flagged to be service messages, and are sent to mobile device by service providers supporting/providing AGAs. They contain links through which the message content, such as AGAs and questionnaires, can be downloaded.

It is possible to automatically download client component for a AGA (such as qClient) and the associated AGA to the mobile device 307, if the user has configured the mobile device to download messages/content automatically.

Figure 3B:
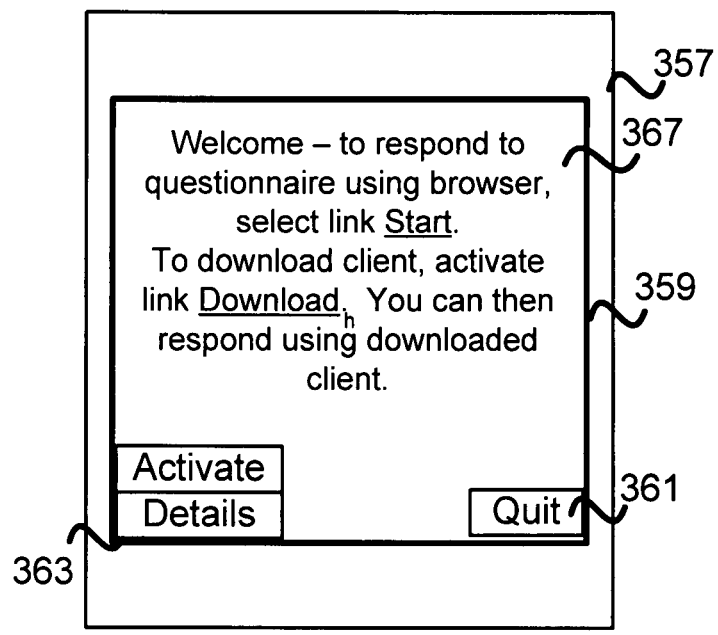
FIG. 3B is an exemplary notification message displayed in a notification window (or pane) on a mobile device, wherein the user is provided the opportunity to start reviewing an AGA using a link provided, that a browser can retrieve, and wherein the user is also provided with the links to download the client component if necessary in order to view the AGA locally in the mobile device.

FIG. 3B is an exemplary notification message 367 displayed in a notification window (or pane) 359 on a mobile device 357, wherein the user is provided the opportunity to start reviewing an AGA using a link provided, that a browser can retrieve, and wherein the user is also provided with the links to download the client component if necessary in order to view the AGA locally in the mobile device 357.

The user who receives notification (such as SMS) can open a URL link provided to review an audio guided activity, using a client such as a browser, interacting with server that is remotely hosted. Alternatively, user can download client activating Download link and then review the AGA locally using the downloaded client.

In addition to AGAs, questionnaires can also be received and reviewed using the mobile device 357. A user who receives notification (such as SMS) can also open a URL link provided to respond to a questionnaire, using client software such as a browser, interacting with server that is remotely hosted that provides web pages for the questionnaire. Alternatively, the user can download client component (such as qClient) by activating a Download link in the received notification (such as SMS message) and then respond locally using downloaded client (that is then installed too).

Figure 3C:
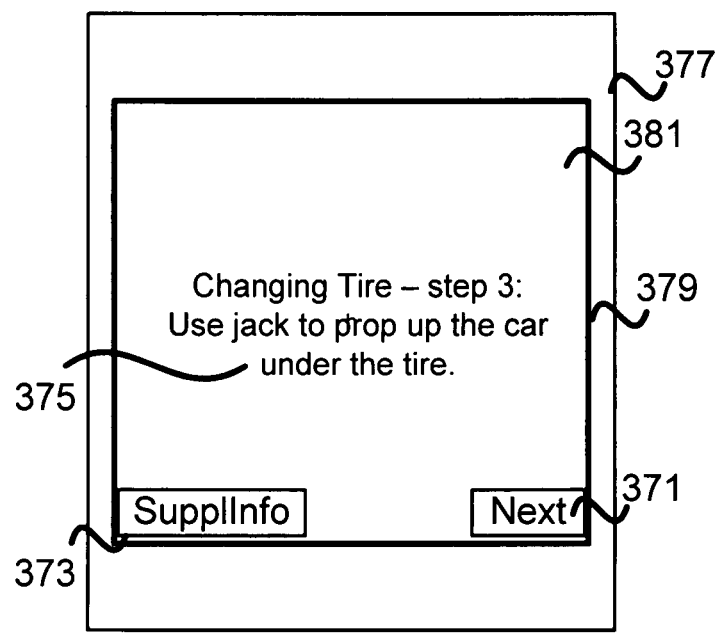
FIG. 3C is an exemplary browser window on a mobile device that is used to retrieve and display activity steps provided as a web pages regarding an audio guided activity, that is distributed by a server in an audio guided system or network.

FIG. 3C is an exemplary browser window 379 on a mobile device 377 that is used to retrieve and display activity steps provided as a web pages regarding an audio guided activity, that is distributed by a server in an audio guided system or network. For the mobile device 377 with no Qclient installed, a browser in the mobile device 377 is used by a user to interact with a server that provides web pages of the AGA. The browser in the mobile device 377 retrieves one step of the multi-step activity at a time and displays it. Audio component, if any, in each page is played by a media player (or some audio player) in mobile device 377. Similarly video content and graphics content, if any are displayed using appropriate plug-ins to the browser.

Thus, in a mobile device 377 with no Qclient, a browser in the mobile device 377 is used to interact with a server that provides the webpages for the various steps of an activity. The browser in mobile device 377 retrieves one question at a time and displays it. Audio component in each page is played by a media player (or some audio player) in the mobile device 377.

Figure 4:
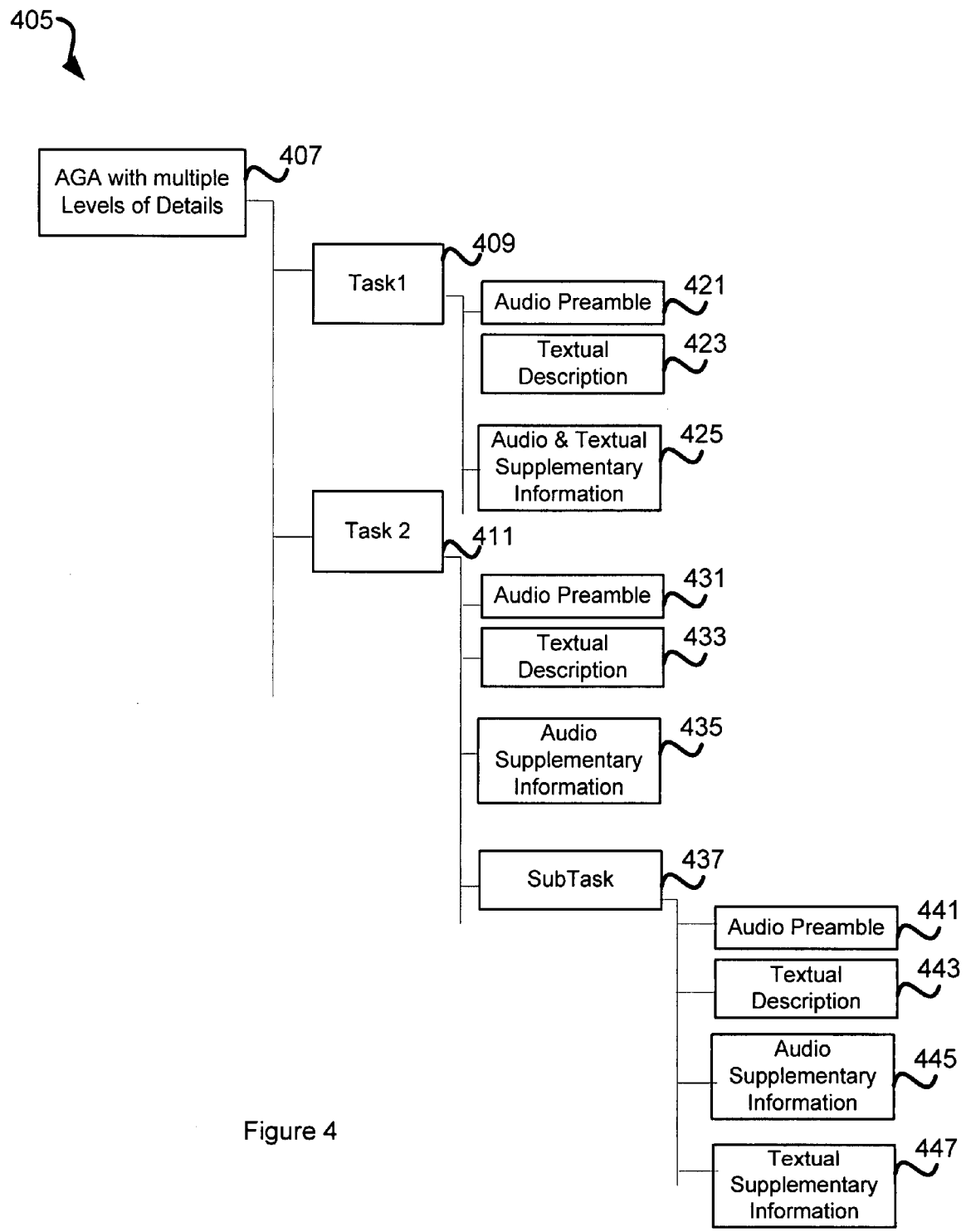
FIG. 4 is a perspective block diagram of the layout of an exemplary audio guided activity that comprises one or more tasks, each with a preamble, a textual description and supplementary information.

FIG. 4 is a perspective block diagram of the layout of an exemplary audio guided activity 407 that comprises one or more tasks 409, 411, each with a preamble, a textual description and supplementary information. The audio guided activity 407 supports multiple levels of details, in that specific tasks associated with specific steps of an activity may comprise of sub tasks. The details of these subtasks may also be specified in the AGA 407. For example, a subtask 437 of task 2 411 may be displayed if necessary by a client component of a mobile device—which would display current portions of the AGA when requested by a user. For the subtask 437, the client displaying the AGA would then display the textual description 443 associated and play the audio preamble 441. In addition, when invoked, the supplementary information 445, 447 for the subtask 437 is also played/displayed respectively.

Figure 5:
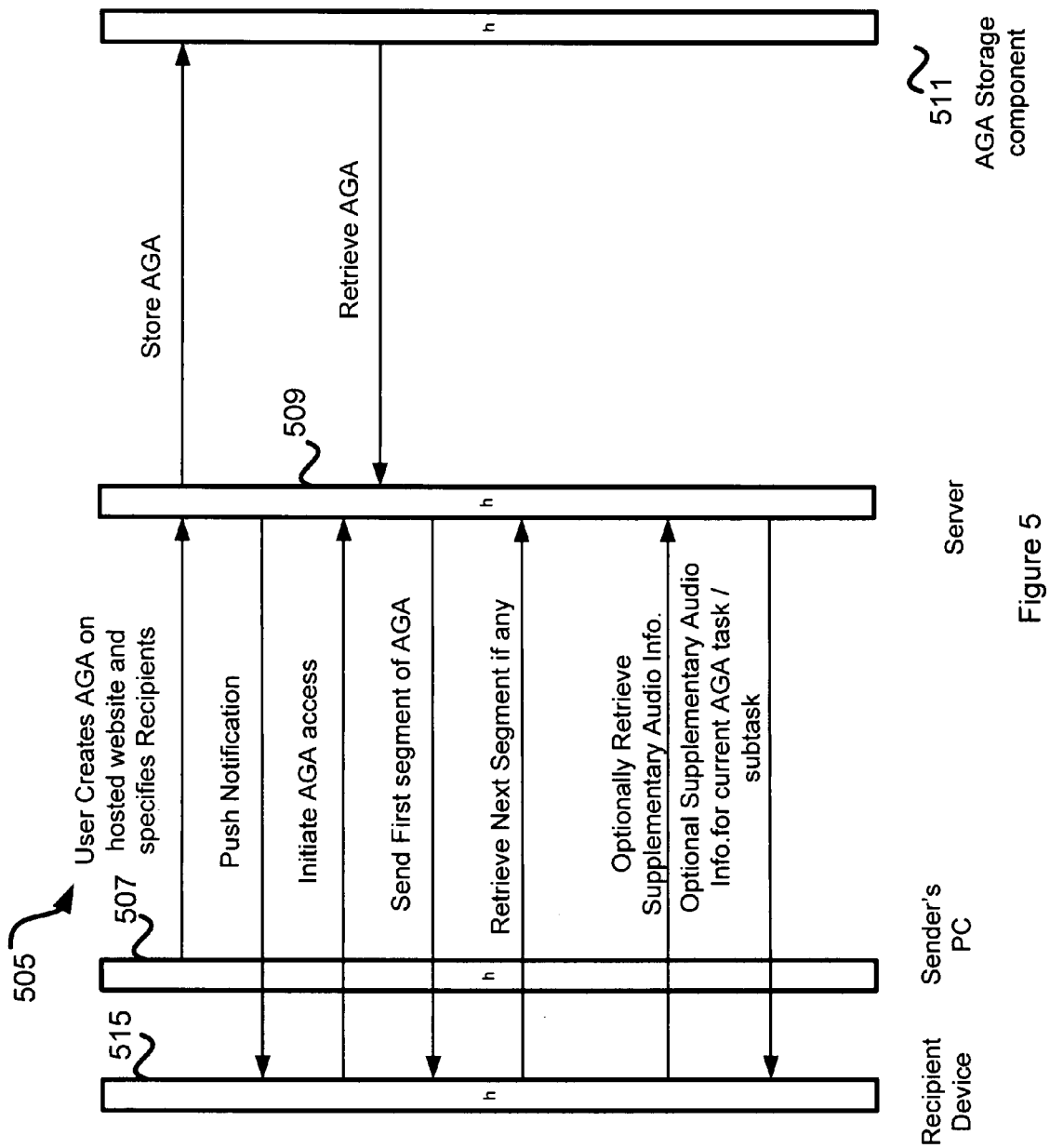
FIG. 5 is an interaction diagram that depicts an exemplary interaction between a sender's PC, notebook, PDA or laptop that is used to create and upload AGAs and questionnaires and a recipient mobile device used to respond to the AGAs and questionnaire, wherein the sender's PC, notebook, PDA or laptop is used by a user to create AGAs with textual and audio components that a server enhances, if necessary, and sends it to recipients.

FIG. 5 is an interaction diagram that depicts an exemplary interaction between a sender's PC, notebook, PDA or laptop 507 that is used to create and upload AGAs and questionnaires and a recipient mobile device 515 used to respond to the AGAs and questionnaire, wherein the sender's PC, notebook, PDA or laptop 507 is used by a user to create AGAs with textual and audio components that a server 509 enhances, if necessary, and sends it to recipients. In one embodiment, the sender's PC, notebook, PDA or laptop 507 comprise the plugin client that works with browsers to facilitate creation of AGAs and browsing through any AGAs received. The user's PC, notebook, PDA or laptop 507 initially sends helps a user create an AGA and then send it to the server 509, along with a list of recipients. The server 509 then forwards the AGA for optional storage and retrieves it when requested by a recipient—the storage being temporary or permanent.

Then, the server 509 sends a push notification to the recipient devices such as recipient mobile device 515. In response, the recipient mobile device 515 initiates the browsing of the AGAs starting with the first step of a multi-step activity. The server 509 sends the first segment of the AGA, which may comprise of a set of steps, to the recipient mobile device 515. In one embodiment, the browser in the recipient mobile device 515 determines that the client plugin should process the AGA and invoke it, passing the AGA to it for processing. The client plugin manages the subsequent processing of the steps in the AGA.

Figure 6:
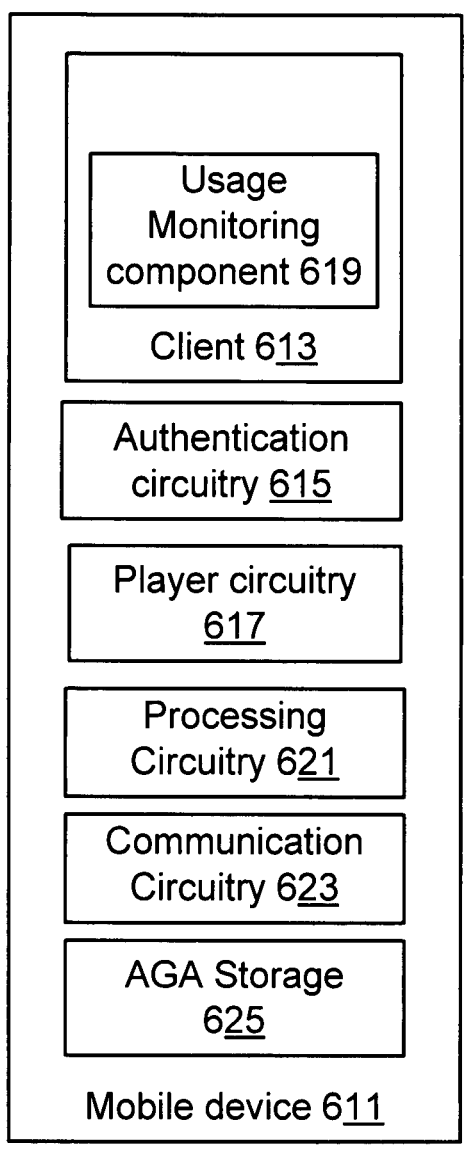
FIG. 6 is a schematic block diagram of a mobile device that supports presenting an activity guided activity (AGA) to a user.

FIG. 6 is a schematic block diagram of a mobile device 611 that supports presenting an activity guided activity (AGA) to a user. The mobile device 611 comprises a processing circuitry 621, an AGA storage 625 where the downloaded/received AGA is stored and managed, a communication circuitry 623 that facilitates AGA downloads, an authentication circuitry 615 that can be used for optional user and/or mobile device 611 authentication, and a player circuitry 617 that is used to play/render audio and/or video components of an AGA. In addition, it comprises a client component 613, that is capable of presenting an AGA to a user, gathering instructions from a user to move forward or step back across the AGA as it is being played, and responding to those user instructions. The client 613 comprises an usage monitoring component 619 that keeps track of the various AGAs that the user has accessed and reviewed, and reports on such usage as required.

Figure 7:
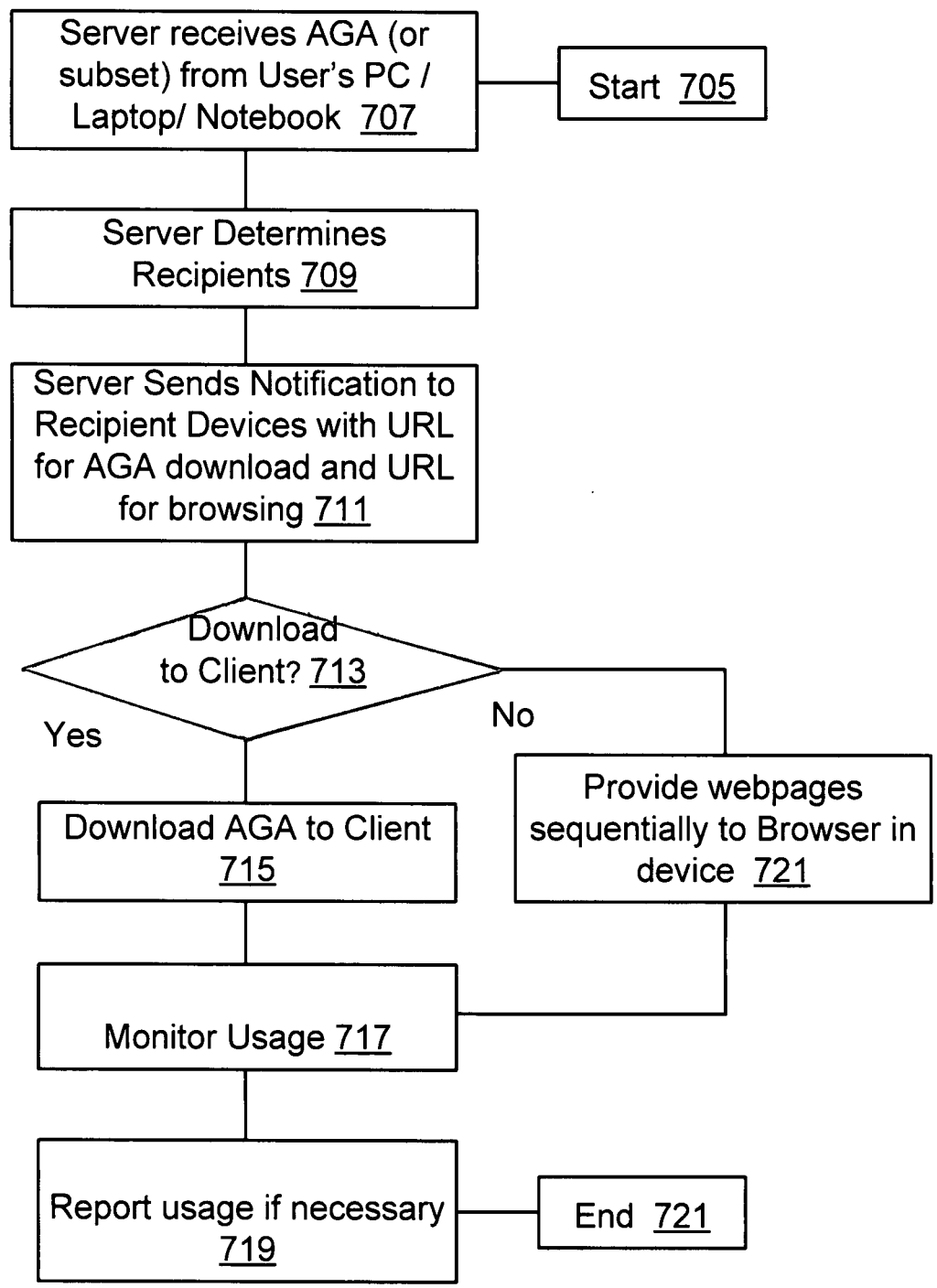
FIG. 7 is a flow chart of an exemplary operation of a server that receives, stores and disseminates AGAs to mobile devices.

FIG. 7 is a flow chart of an exemplary operation of a server that receives, stores and disseminates AGAs to mobile devices. At a start block 707, the server receives an AGA (or a subset of an AGA) from a user's PC/Laptop/computer where the user creates the AGA. At a next block 709, the server determines recipients for the AGA. In one embodiment, recipients are provided as a default list by a user, and reused on subsequent AGAs. In another embodiment, recipients sent along with an AGA are used instead of a default list of recipients already provided.

Then, at a next block 711, the server sends a notification, such as an SMS message, or an email, to a user of a mobile device or a PC, the user being one of the recipients. The notification to recipient devices comprises an URL from where the AGA can be downloaded. It also comprises (optionally) an URL where the AGA can be remotely browsed from a website, such a feature being useful for access from a mobile device or PC that does not have the necessary client component. Typically, the URL referencing the AGA points to a webpage or AGA content hosted by the server, although URLs for other websites may also be used.

At a next decision box 713, the server determines if a client exists in a mobile device/PC that can download an AGA and present it to the user. For example, the server can determines if the mobile device is ready to download an AGA from the server when the mobile device a notification and the server receives a response to the notification sent to the mobile device. If the server does determine that the client exists in the device and the client is ready, then, at a next block 715, the server facilitates download of the AGA to the client. Then, at a next block 717, the server monitors the usage by the client 717. Then, at a next block 719, the server reports usage by the mobile device/PC if necessary, such reporting being periodic, event based, etc. based on policies and preferences. Finally, at an end block 719 the processing terminates.

If, at the decision block 713, server does determine that the client does not exist or is not ready, then, at a next block 723, the server receives a request for webpages from the mobile device and provides webpages to the mobile device or PC where a browser, such as an HTTP based browser, receives and presents the AGA steps to the user. The server presents the webpages sequentially to the browser in the mobile device or PC. Then, at a next block, the server monitors usage and subsequently reports usage if necessary at a next block 719.

Figure 8:
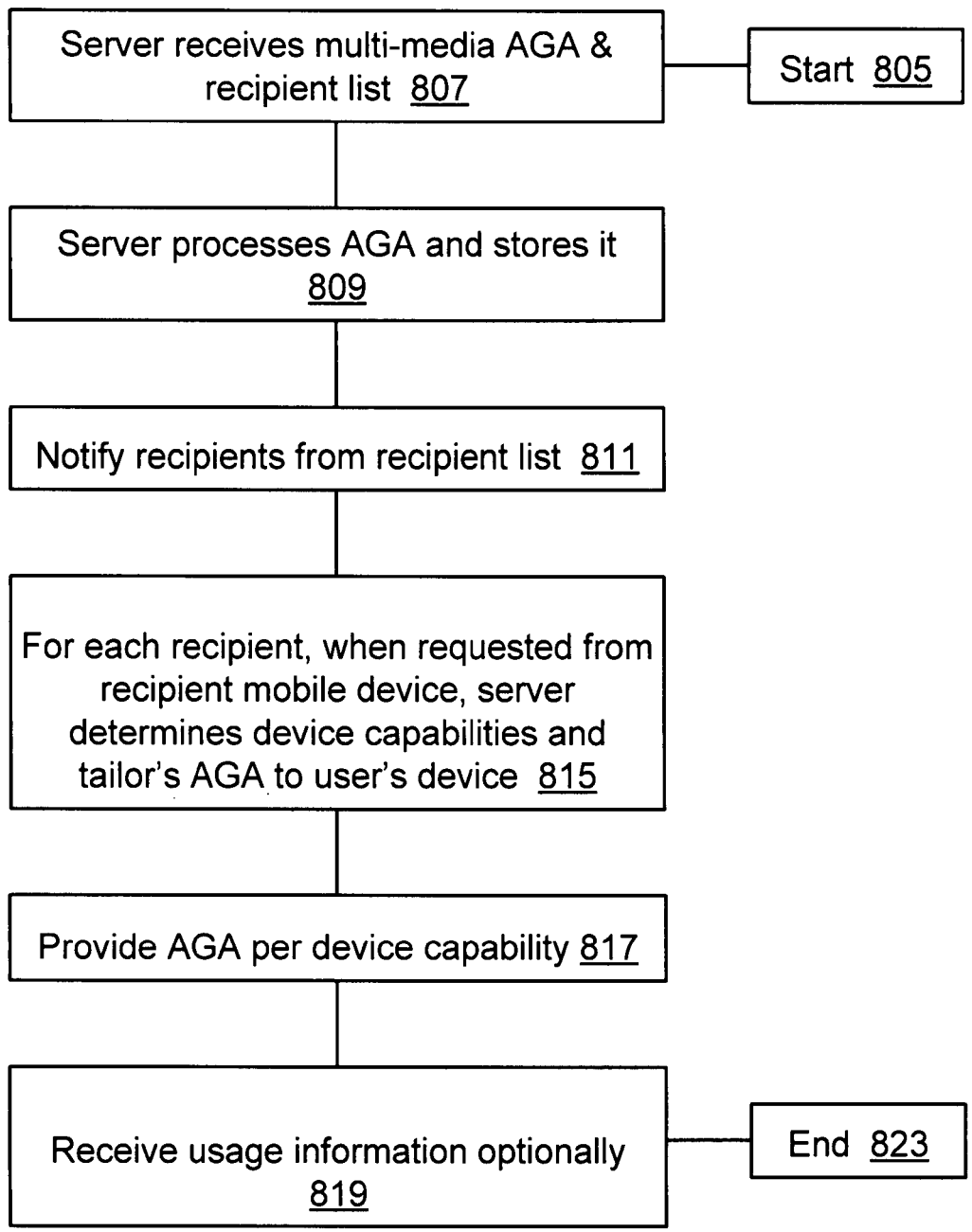
FIG. 8 is a flowchart of an exemplary operation of the server that facilitates tailored AGAs wherein the AGA is tailored based on device capabilities of the user's mobile device or PC.

FIG. 8 is a flowchart of an exemplary operation of the server that facilitates tailored AGAs wherein the AGA is tailored based on device capabilities of the user's mobile device or PC. At a start block 805, the server starts processing. Then, at a next block 807, the server receives a multi-media AGA and a recipient list from a sender's PC or computer. The sender might be the person who created the AGA, or another person responsible for creation and distribution of an AGA. The recipient-list can be a list of phone numbers, email addresses, IP addresses or a combination of these.

Then, at a next block 809, the server processes the AGA and stores it. For example, if the server has to insert a boilerplate text, pictures or boilerplate audio components to an AGA, it does it. This is done based on preferences and policies. At a next block 811, the server notifies recipients from the recipient list provided by user or setup as a default.

Then, at a next block 815, for each recipient in the recipient list, when the AGA is requested from the recipient mobile device or PC, the server determines corresponding device's capabilities and tailor's the AGA to the user's device. Tailoring involves reducing, shrinking or cropping images, reducing or eliminating audio content, etc. Then, at a next block 817, the server provides the tailored AGA per device capabilities. Then, at a next block 819, the server receives usage information and other statistics optionally sent by the client in the recipient mobile device or PC. Finally, processing terminates at an end block 823.

Figure 9:
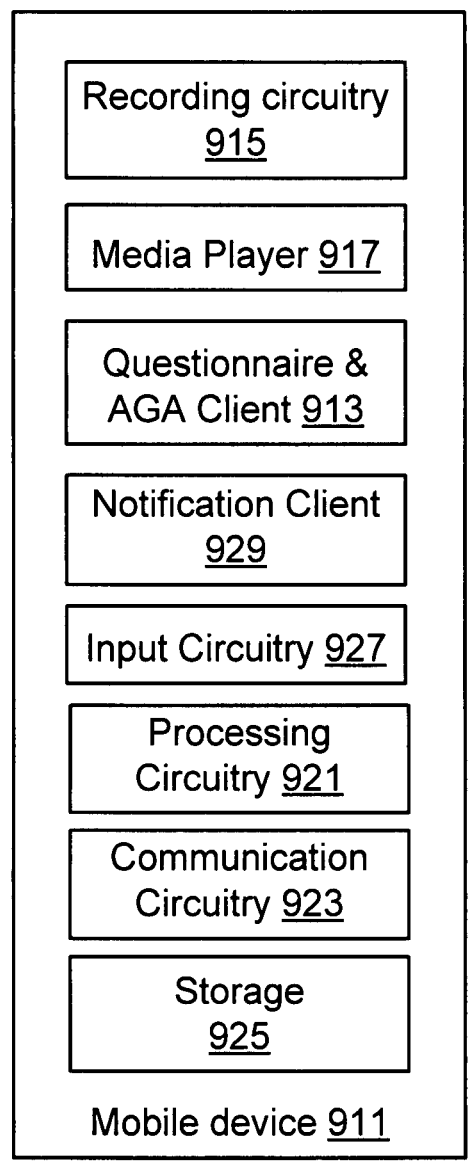
FIG. 9 is another schematic block diagram of a mobile device that supports presenting an activity guided activity (AGA) to a user.

FIG. 9 is another schematic block diagram of a mobile device 911 that supports presenting an activity guided activity (AGA) to a user. The mobile device 911 comprises a processing circuitry 921, a storage 925 where the downloaded/received AGA is stored and managed, and a communication circuitry 923 that facilitates AGA downloads. It also comprises a questionnaire and AGA client 913 that handles audio-guided questionnaires as well as audio guided activities, a media player circuitry 917 that is used to play/render audio and/or video components of an AGA or a questionnaire that may be currently presented to a user, and a notification client 929 that receives notifications for AGAs and questionnaires from a server distributing them. In addition, it comprises a recording circuitry 915 and input circuitry 927 that can be used by a user to create audio guided activities in an ad hoc manner using the mobile device 911.

In one embodiment, a user of the mobile device 911 can create adhoc audio guided activity with the help of the questionnaire and AGA client 913. The user employs the recording circuitry to record audio and/or video components that are incorporated into an AGA created by the user employing the questionnaire and AGA client 913. The user employs the input circuitry 927 to provide textual inputs that might be stored as textual preambles for the AGA. The questionnaire and AGA client 913 employs the communication circuitry 923 to send the adhoc AGA created in the mobile device 911 to a server with whom the mobile device is communicatively coupled.

Figure 10:
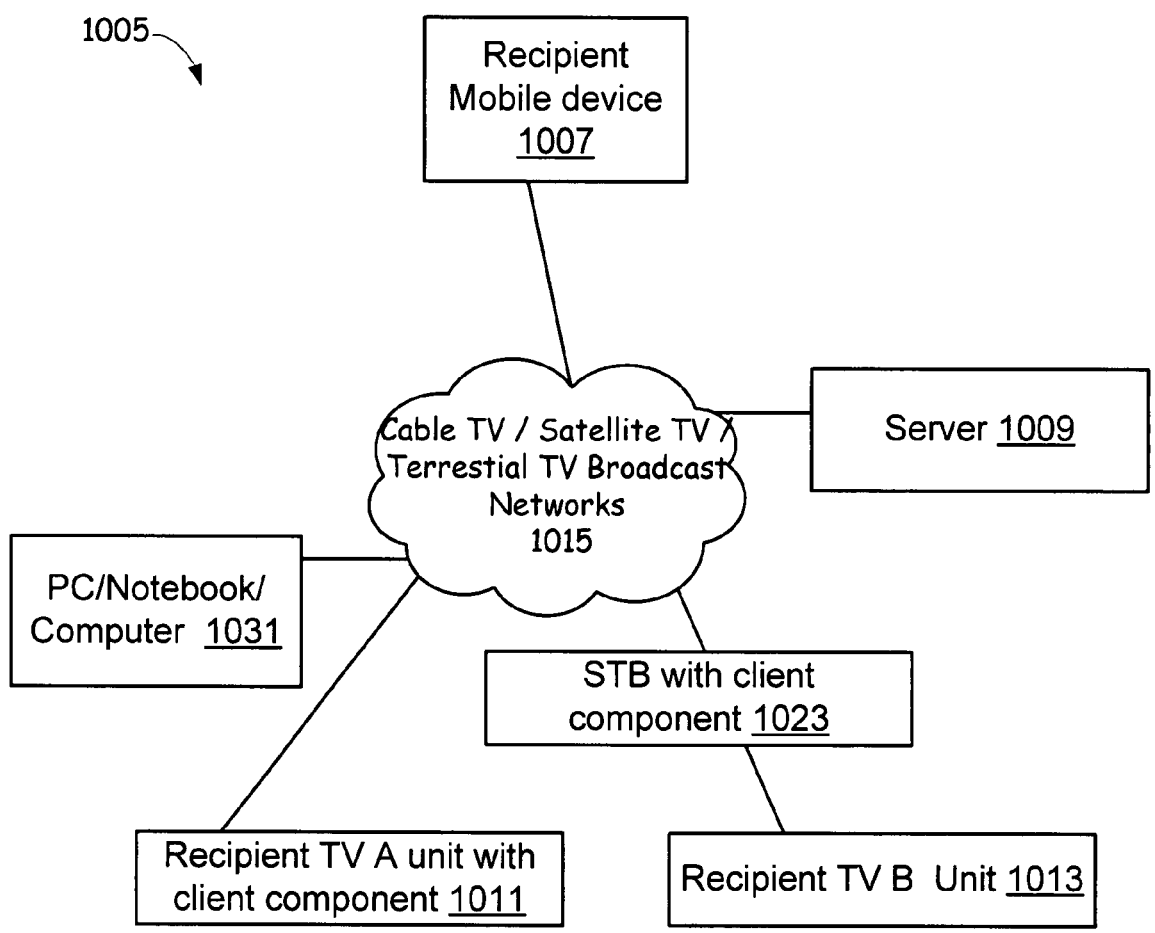
FIG. 10 is a perspective block diagram of a network wherein guided activities are provided to users such that a user can view them on their televisions.

FIG. 10 is a perspective block diagram of a network wherein guided activities are provided to users such that a user can view them on their televisions. A user creates guided activity using PC/Notebook/Computer and uploads it to a server 1009, or uses webpages provided by the server 1009 to create it. The user can uses or creates Video clips, graphics, audio, etc. to create guided activity. The server 1009 receives guided activity (including multi-media and videos) from user's PC/Notebook/computer 1031 and adds boilerplate content if needed. The server 1009 determines which recipient TVs 1011, 1013 need to receive the guided activity and forwards it. Optionally the server 1009 broadcasts the guided activity to all TVs and set-top-boxes (and mobile devices too).

The recipient TV A 1011 with the necessary client component receives the guided activity, lets the user browse through each step, and request additional details as supplementary information when the user requests them. In addition, the recipient TV B 1013 that does not have a client component uses a client component provided by a STB 1023 to receive and browse through the guided activity.

The terms "circuit" and "circuitry" as used herein may refer to an independent circuit or to a portion of a multifunctional circuit that performs multiple underlying functions. For example, depending on the embodiment, processing circuitry may be implemented as a single chip processor or as a plurality of processing chips. Likewise, a first circuit and a second circuit may be combined in one embodiment into a single circuit or, in another embodiment, operate independently perhaps in separate chips. The term "chip", as used herein, refers to an integrated circuit. Circuits and circuitry may comprise general or specific purpose hardware, or may comprise such hardware and associated software such as firmware or object code.

The terms "audio preamble" and "voice preamble" as used herein may refer to recorded voice inputs that a user records, to provide a question/prompt in human language, that also selectively incorporates responses in multiple choice format to aid selection by a recipient. The audio preamble may be captured by a mobile device in MP3 format, AMR format, WMA format, etc.

The term "audio-assisted questionnaire" as used herein may refer to a questionnaire comprising audio portions, such as audio preambles, audio supplementary information, audio descriptions of multiple choices, etc. that make it possible for a recipient to listen to most of the information of the questions in a questionnaire (employing human voices, in audible form) without having to read all of that in a small screen of a mobile device, without requiring scrolling through textual descriptions on a limited/constrained device.

As one of ordinary skill in the art will appreciate, the terms "operably coupled" and "communicatively coupled," as may be used herein, include direct coupling and indirect coupling via another component, element, circuit, or module where, for indirect coupling, the intervening component, element, circuit, or module does not modify the information of a signal but may adjust its current level, voltage level, and/or power level. As one of ordinary skill in the art will also appreciate, inferred coupling (i.e., where one element is coupled to another element by inference) includes direct and indirect coupling between two elements in the same manner as "operably coupled" and "communicatively coupled."

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention.

One of average skill in the art will also recognize that the functional building blocks, and other illustrative blocks, modules and components herein, can be implemented as illustrated or by discrete components, application specific integrated circuits, processors executing appropriate software and the like or any combination thereof.

Moreover, although described in detail for purposes of clarity and understanding by way of the aforementioned embodiments, the present invention is not limited to such embodiments. It will be obvious to one of average skill in the art that various changes and modifications may be practiced within the spirit and scope of the invention, as limited only by the scope of the appended claims.

The invention claimed is:
1. A mobile device communicatively couple to a server based on communication needs, the mobile device comprising:
   at least one non-volatile memory having stored therein one or both of firmware and software;
   at least one processor operably coupled to the non-volatile memory, wherein the at least one processor, during operation, at least:
      wirelessly receives and presents to a user of the mobile device instructions associated with an activity to be conducted by the user, wherein the instructions are provided as a multistep guided activity packaged and delivered as an XML document comprising components of presentation for multiple interaction screens, behavior for specific buttons that may be activated and screen transition data;
      presents interaction screens corresponding to specific steps of the multistep guided activity, wherein each of the interaction screens also presents detailed information on the corresponding specific step of the multistep guided activity to the user in audio form, graphics form and video form;
      receives user input associated with the at least one step of the multistep guided activity;
      wherein the at least one processor presents supplementary information comprising additional details for any step of the multistep guided activity; and
      selectively advances to a subsequent step and to a corresponding subsequent screen, or reverts to a previous step and to a corresponding previous screen of the multistep guided activity, in response to the user input.

2. The mobile device according to claim 1, wherein the at least one processor, when it presents the steps, presents a corresponding textual information, an audio information and a graphics information for each of the steps of the multistep guided activity, and wherein the multistep guided activity comprises a sequence of steps necessary to configure a service, a machine, an electronic device or a vehicle.

3. The mobile device according to claim 1, wherein the at least one processor, keeps track of the various multi-step guided activities that the user has accessed and reviewed, and reports such access as required.

4. The mobile device according to claim 1, wherein the mobile device receives an audio guided activity package over-the-air comprising the at least one portion of a multistep guided activity and presents it to the user.

5. The mobile device according to claim 1, wherein the at least one processor, during operation,
   offers the user an opportunity to download a client component that is capable of displaying the multistep guided activity.

6. The mobile device according to claim 1, wherein
   the mobile devices displays in a notification screen an opportunity to start reviewing the guided activity by activating a link provided, and wherein the user is also provided with links to download a client component necessary in order to view the guided activity locally in the mobile device.

7. A method of creating and disseminating step by step instructions of a multi-step activity in a network to a plurality of mobile devices, the method comprising:
   creating a multistep guided activity package comprising instructions associated with an activity to be conducted by the user, wherein the multistep guided activity package is delivered as an XML document, with supplementary information comprising additional details for each step of the multistep guided activity;
   storing the multistep guided activity package at a server along with a list of recipients;
   identifying as target devices those of the plurality of mobile devices associated with recipients on the list of recipients;
   determining which of the target devices do not comprise a client component capable of handling multistep guided activity but are able to present some but not all of the content of the multistep guided activity package and communicating only the relevant subset of the multistep guided activity package; and
   wirelessly communicating the entire multistep guided activity to the target devices that comprise the client component capable of handling multistep guided activity and therefore able to present to a user all of the content.

8. The method of claim 7, further comprising:
transferring a newly created audio guided activity for distribution to a server.
9. The method of claim 7 further comprising:
   sending a notification regarding the availability of the multistep guided activity package to the target devices wherein the notification also comprises a link that can be activated to download a client component so that it could be installed before displaying the multistep guided activity.

10. The method of claim 7, wherein the audio guided activity creator tool comprises a billing functionality the method further comprising:
   billing for the creation of multistep guided activity packages and for the distribution of multiple step guided activity packages.

11. The method of claim 7 further comprising:
   processing the multistep guided activity package to incorporate a missing element employing at least one of a boilerplate text and a boiler plate audio information in order to create a prepared multistep guided activity package that can be disseminated;
   notifying the target devices of the availability of the prepared multistep guided activity package; and
   providing the prepared multistep guided activity package to at least one of the target devices.

12. The method of claim 7, wherein the multistep guided activity package is a multistep food recipe for preparing and serving a food item.

13. The method of claim 7, wherein the multistep guided activity package is a sequence of steps necessary to diagnose and fix a problem with a machine, an electronic device or a vehicle.

14. The method of claim 7, wherein the multistep guided activity package is a sequence of steps necessary to configure a service, a machine, an electronic device or a vehicle.

15. The method of claim 7, wherein each recipient on the list of recipients comprises one or more of:
   an email address;
   a phone number;
   a device identification;
   a user name; and
   a universal resource locator.

16. The method of claim 7 further comprising:
   notifying the target devices with information regarding the availability of the multistep guided activity package.

17. The method of creating and disseminating content according to claim 16 further comprising:
   receiving from the target devices a request for download of the multistep guided activity package.

* * * * *